United States Patent
Oswald et al.

(10) Patent No.: US 10,054,920 B2
(45) Date of Patent: Aug. 21, 2018

(54) REMOTE DIAGNOSTIC SYSTEM

(71) Applicant: Manitowoc Crane Companies, LLC, Manitowoc, WI (US)

(72) Inventors: Matthew T. Oswald, Manitowoc, WI (US); Jeffrey Scott Blair, Manitowoc, WI (US); James A. Alger, Shippensburg, PA (US)

(73) Assignee: MANITOWOC CRANE COMPANIES, LLC, Manitowoc, WI (US)

( * ) Notice: Subject to any disclaimer, the term of this patent is extended or adjusted under 35 U.S.C. 154(b) by 589 days.

(21) Appl. No.: 14/590,608

(22) Filed: Jan. 6, 2015

(65) Prior Publication Data

US 2015/0192916 A1 Jul. 9, 2015

Related U.S. Application Data

(60) Provisional application No. 61/924,923, filed on Jan. 8, 2014.

(51) Int. Cl.
*G06F 17/50* (2006.01)
*G06F 17/10* (2006.01)
(Continued)

(52) U.S. Cl.
CPC ......... *G05B 17/02* (2013.01); *G05B 23/0243* (2013.01)

(58) Field of Classification Search
CPC .. G06F 17/5009; G06F 17/5018; G06F 17/02; G06F 17/5036; G03F 7/705;
(Continued)

(56) References Cited

U.S. PATENT DOCUMENTS 8,249,837 B1 * 8/2012 Prabhu ................ G06F 17/5018
703/2
8,768,652 B1 * 7/2014 Mirtich ............... G06F 17/5086
345/619
(Continued)

FOREIGN PATENT DOCUMENTS

CN 1548286 A 11/2004
CN 201397583 Y 2/2010
(Continued)

OTHER PUBLICATIONS

Hasan et al., Advanced simulation of tower crane operation utilizing system dynamics modeling and lean principles, Dec. 2010, 10 pages.*

(Continued)

*Primary Examiner* — Thuy Dao
(74) *Attorney, Agent, or Firm* — Levenfeld Pearlstein, LLC

(57) ABSTRACT

A remote diagnostic system for remotely diagnosing and developing a dynamic system including a dynamic system being controlled by a first control system and a device model being controlled by a second control system. The device model simulates the dynamic system and inputs and corresponding outputs are recorded to test the control system and operation of the dynamic system. During operation the dynamic systems inputs and outputs are recorded. The dynamic system input and outputs may then be compared to the device model inputs and outputs to check the accuracy of the device model. The device model may then be updated based on the results of the comparison.

13 Claims, 5 Drawing Sheets

(51) Int. Cl.
*G05B 17/02* (2006.01)
*G05B 23/02* (2006.01)

(58) Field of Classification Search
CPC .... G05B 17/02; G05B 13/04; G05B 23/0243; G01B 11/0675; G01B 2290/50; G01B 2290/70; G01B 9/02067; G01B 9/02084
See application file for complete search history.

(56) References Cited

U.S. PATENT DOCUMENTS

| | | | | |
|---|---|---|---|---|
| 9,540,218 | B2* | 1/2017 | Tanizumi | B66C 13/46 |
| 2006/0248510 | A1* | 11/2006 | Dournov | G06F 17/5009 |
| | | | | 717/124 |
| 2008/0004898 | A1* | 1/2008 | Hubler | B66C 23/905 |
| | | | | 703/7 |
| 2009/0276136 | A1* | 11/2009 | Butler | G05B 23/0281 |
| | | | | 701/100 |
| 2010/0131080 | A1* | 5/2010 | Brown | G05B 19/042 |
| | | | | 700/17 |
| 2011/0087400 | A1 | 4/2011 | Lorimier | |
| 2011/0301933 | A1* | 12/2011 | Cutts | G06Q 40/04 |
| | | | | 703/22 |
| 2012/0095653 | A1* | 4/2012 | Morath | B66C 13/16 |
| | | | | 701/50 |
| 2014/0108640 | A1* | 4/2014 | Mathis | H04L 41/145 |
| | | | | 709/224 |
| 2016/0031680 | A1* | 2/2016 | Delplace | B66C 13/16 |
| | | | | 703/7 |
| 2016/0312607 | A1* | 10/2016 | McNealy | E21B 41/0092 |

FOREIGN PATENT DOCUMENTS

| | | |
|---|---|---|
| CN | 102866016 A | 1/2013 |
| CN | 103064381 A | 4/2013 |
| WO | WO 2013/170026 A1 | 11/2013 |

OTHER PUBLICATIONS

Paz et al., Reusable template for simulation of overhead cranes interferences, Dec. 2010, 9 pages.*

Xie et al., Integrating realtime project progress input into a construction simulation model, Dec. 2011, 12 pages.*

European Search Report for corresponding European Application No. 14198839.4, dated Oct. 12, 2015 (7 pages).

* cited by examiner

REMOTE DIAGNOSTIC SYSTEM

The present patent document claims the benefit of the filing date under 35 U.S.C. § 119(e) of Provisional U.S. Patent Application Ser. No. 61/924,923, filed Jan. 8, 2014, which is hereby incorporated by reference.

BACKGROUND

The present application relates to the field of field service and diagnostics, and more particularly to systems and methods for remote diagnostics utilizing field data system modeling.

Dynamic mechanical systems may have numerous components that are software controlled. The components are subject to wear as the mechanical system ages and the software must be able to account for any wear that the components experience. The dynamic mechanical system may experience service events in the field, either in the form of a software fault where the software does not properly account for a particular situation, or in the form of a mechanical event in which a mechanical component operates abnormally.

During the design of the control software for the dynamic mechanical system, a mathematical model of the dynamic system may be used to emulate the mechanical system. This allows the software to be tested without actually having to install the software on the system. This allows the designer to rapidly evaluate the software and its functionality. The mathematical model is designed to accept a number of inputs including inputs such as a model mechanical fault to design the system to respond to such situations.

In some industries, such as the crane industry, the cost of an unexpected service event in the field may be substantial. In some instances, the service event may result in a complete work stoppage. It is therefore beneficial to be able to predict when a service event may occur and correct, or plan for the condition before it happens. This is normally done through routine inspections and maintenance. However, some crane components, such as a boom extension or outrigger extension, may be difficult to inspect without physically disassembling the component. For example, wear pads are disposed internal to the crane component and may not be accessible for inspection. Similarly, seals within a hydraulic cylinder and not visible with the cylinder in operation. To physically inspect these parts requires disassembly of the components which entails a stoppage of work. Disassembly can cause additional wear on components that may be avoided by adopting a maintenance program based on actual equipment use.

It would be useful to have a system for accurately predicting service events of a software controlled mechanical system. This would reduce the number of service events leading to downtime. Preventative maintenance will be able to be scheduled based on the use of the machine. Current preventative maintenance schedules are based on hours of operation and calendar days. The remote diagnostics system will be able include the amount of work, operational profile, weather, and other data to adjust the preventative maintenance schedule.

SUMMARY

Embodiments of the invention include a remote diagnostic system. The remote diagnostic system includes a device model, a dynamic system in an operational field, a control system, a data collection and distribution system, and a data warehouse configured to store and analyze the collected data. The device model simulates a dynamic system and has a plurality of model inputs and a plurality of model outputs dependent upon the device model and the plurality of model inputs. The dynamic system is in an operational field and produces real data during operation. The control system is adapted to operably couple to the dynamic system and is configured to receive operator input and control the dynamic system through control signals in response to the operator input. The data collection and distribution system is configured to collect data from a plurality of data sources including the dynamic system, the device model, and the control system, and distribute data to a plurality of data destinations. The data warehouse is configured to consolidate, aggregate, and store the collected data. The data warehouse will provide data to the analysis system and reporting system.

Another embodiment includes a method for remotely diagnosing a dynamic system. In the method, a mathematical model of a dynamic system is generated that has an interface for receiving at least one model input and at least one model output dependent on the at least one model input and the mathematical model. A plurality of model inputs is then input into the mathematical model. The plurality of model inputs and a plurality of corresponding model outputs of the mathematical model are recorded to a model record. A plurality of real input data and real output data is recorded to at least one real record. The real input data and real output data are associated with the dynamic system. At least one relevant real record is determined that has a real output of interest from among the plurality of real records. The at least one real output of interest is compared to the plurality of model records to identify relevant model records having at least one model output corresponding to the at least one real output of interest. The relevant model records are analyzed to determine model inputs in common with the real input data of the relevant real records. An indication of the model inputs in common with the real input data of the relevant records is then output.

BRIEF DESCRIPTION OF THE DRAWINGS

To further clarify the above and other advantages and features of the one or more present inventions, reference to specific embodiments thereof are illustrated in the appended drawings. The drawings depict only typical embodiments and are therefore not to be considered limiting. One or more embodiments will be described and explained with additional specificity and detail through the use of the accompanying drawings in which.

The drawings are not necessarily to scale.

DETAILED DESCRIPTION

Embodiments of the invention include systems and methods for accurately predicting service events of a dynamic system. One particular field in which this is useful in the field of construction equipment and more particularly cranes. Embodiments of the invention are suitable for other types of dynamic systems such as industrial equipment and commercial food service systems. Embodiments of the present invention will now be further described as related to a crane, although it is understood that the invention is applicable to other dynamic systems. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Figure 1:
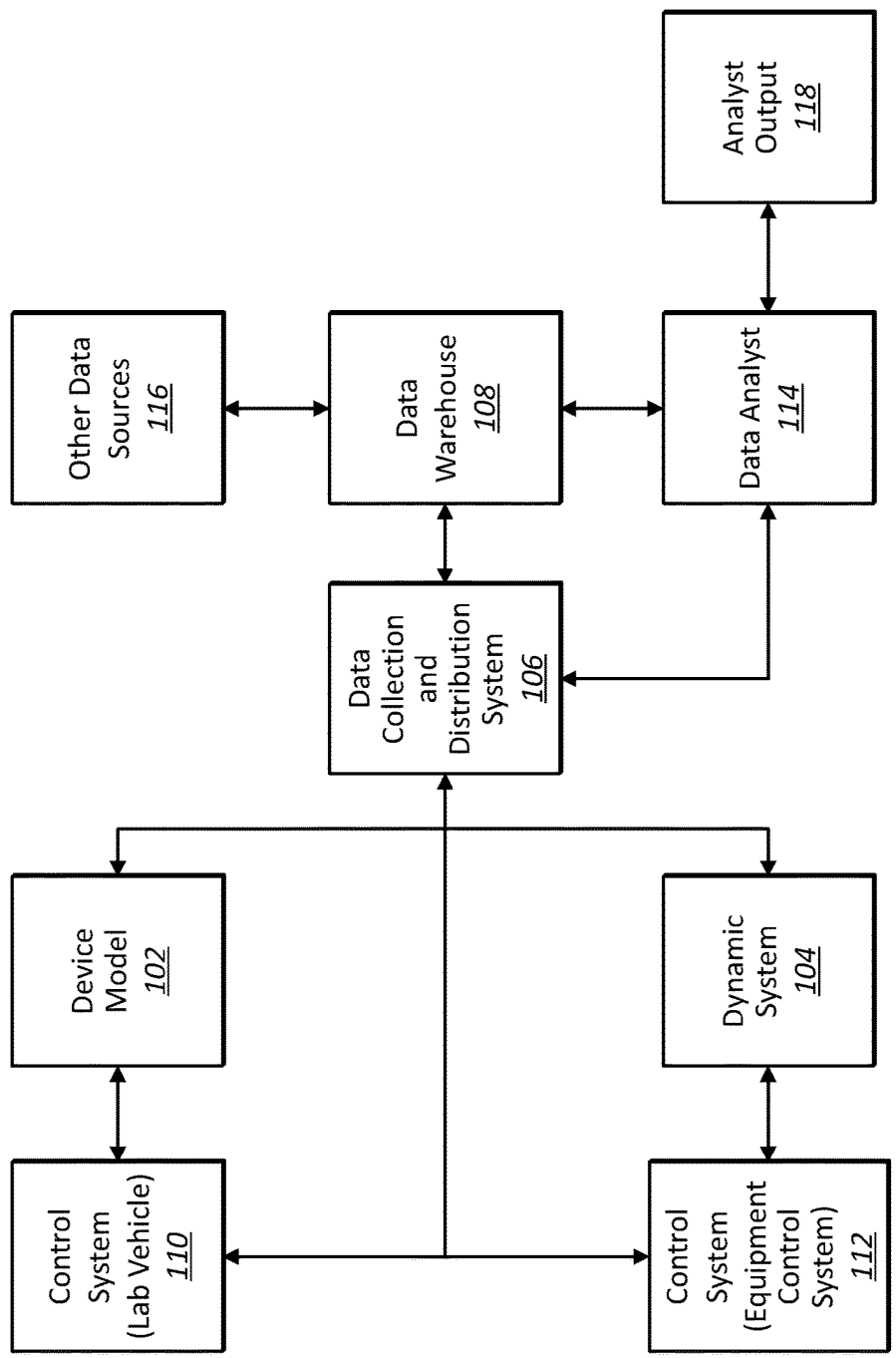
FIG. 1 is a schematic view of a system for remote diagnostics in accordance with an embodiment of the invention.

FIG. 1 is a schematic of an embodiment of a remote diagnostic system 100. The remote diagnostic system 100 comprises a device model 102, a dynamic system 104, a first control system 110 (also referred to herein as the "first control unit"), a second control system 112 (also referred to herein as the "second control unit"), a data collection and distribution system 106, a data warehouse 108, a data analysis system 114, a data reporting system 118, and other data sources. The first control system 110 or lab vehicle is operably coupled to the device model 102 and the data collection and distribution system 106. The second control system 112, or equipment control system, is operably coupled to dynamic system 104 and the data collection and distribution system 106. The device model 102 is operably coupled to the data collection and distribution system 108. The dynamic system 104 is operably coupled to the data collection and distribution system 108.

The operable coupling for each of the components of the remote diagnostic system 100 may comprise any communication link operable to allow the components to communicate with one another. For example, the operable coupling may comprise an analog wired connection, a digital wire connection, an analog wireless connection, or a digital wireless connection. The operable couplings may be different for each of the components and may comprise more than one type of communication link. For example, the first control system 110 may communicate with the device model 102 over a wired connection, but communicate with the data collection and distribution system 106 over a wireless connection. Furthermore the operable couplings may be combined into a single communication link. For example, the first control system 110 and the device mode 1021 may both communicate with the data collection and distribution system 108 over a common wireless link.

The dynamic system 104 is a dynamic mechanical system that is controlled by the second control system 112. In some embodiments, the dynamic system 104 may comprise a crane system as described below, or it may comprise an individual component or system of the crane system. For example, the dynamic system 104 may comprise a crane boom 402, crane outrigger 404, crane superstructure 406, or a combination of the components to form a system. In other embodiments the dynamic system 104 may comprise a different system such as an industrial cooling system. Other dynamic systems are within the scope of the invention, provided that they are controlled by a control system and may be modeled. The dynamic system 104 accepts at least one input from the second control system 112 and operates to perform a function associated with the input.

The data warehouse 108 stores data collected from the control systems 110, 112, the device model 102, and the dynamic system 104. The data warehouse 108 may be a single storage source, or it may be distributed among multiple storage sources. The data warehouse 108 may store data obtained from other sources 116 as well. For example, the data warehouse 108 may store information related to service history of a dynamic system, social media related to the dynamic system, and weather data. The service history may include information such as warranties associated with the dynamic system, communications from a crane owner or operator about the service of the crane, and a product improvement plan. The social media information may include published information about the dynamic system 104 from sources such as LinkedIn, Facebook, Twitter, news feeds, and blogs. The data warehouse 108 may store the actual weather data, or it may be data providing the location of a crane which may then be used to look up weather data.

The data analysis 114 component may have an analysis output 118 for consuming information related to the analysis of the data contained in the data warehouse 108. For example, the analysis output 118 may be operably coupled to a display for indicating upcoming maintenance requirements of a particular crane. In some embodiments the analysis output 118 may output data directly to a crane user, while in other embodiments the analysis output 118 may output data to a maintenance facility.

Figure 2:
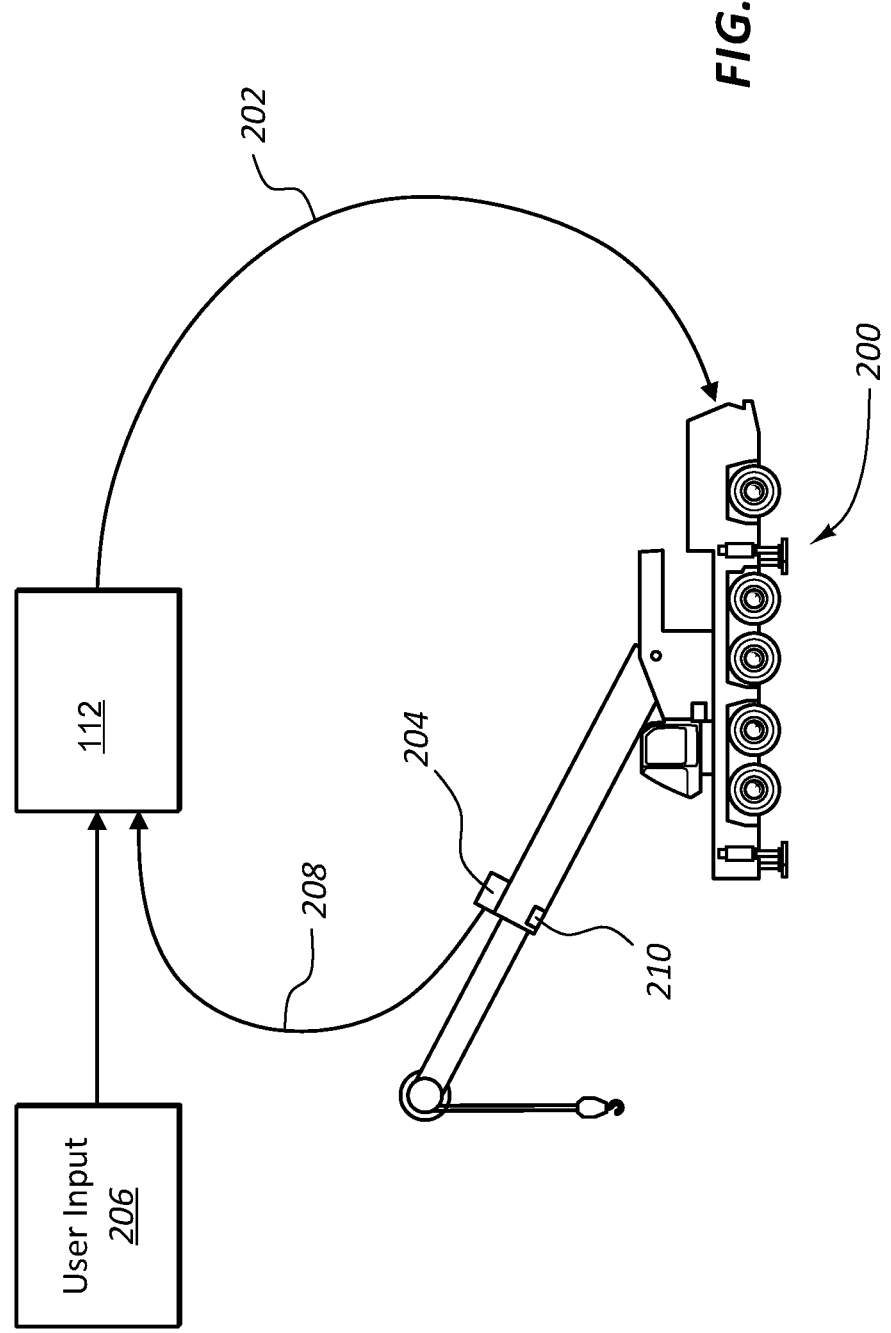
FIG. 2 is a schematic view of a crane having a control system in accordance with an embodiment of the invention.

FIG. 2 illustrates the operation of the second control unit 112 and a dynamic system 104 in the form of a crane 200. The crane 200 is comprised of multiple dynamic components such as a boom 210, drive train, rotating bed, counterweight, and outriggers. The second control system 112 accepts a user input 206 and generates a control signal 202 for controlling the crane 200. The crane 200 may have at least one sensor 204 configured to measure a characteristic of the crane 200. The sensor 204 may output a feedback signal 208 representative of the measured characteristic. The feedback signal 208 may be sent to the second control system 112 to provide feedback to the second control system 112. The second control system 112 may then vary the control signal 202 for the crane 200 based on the feedback signal 208.

For example, an operator may input a boom out user input 206. The second control unit 112 receives the boom out user input 206 and generates a boom out control signal 202. The crane 200 then increases pressure in a hydraulic cylinder to move the boom 210 outward, with the sensor 204 measuring the position of the boom 210. The sensor 204 outputs a feedback signal 208 indicating the position of the boom 210 to the second control unit 112. Based on the feedback signal 208, the second control unit 112 may alter the control signal 202 to further increase the pressure in the cylinder to further extend the boom 210 or may decrease the pressure to stop the boom 210 from extending further. This is a very simplified example of how the second control system 112 operates. In reality, the second control system 112 accepts multiple inputs and controls multiple components, each of which may be interrelated.

Figure 3:
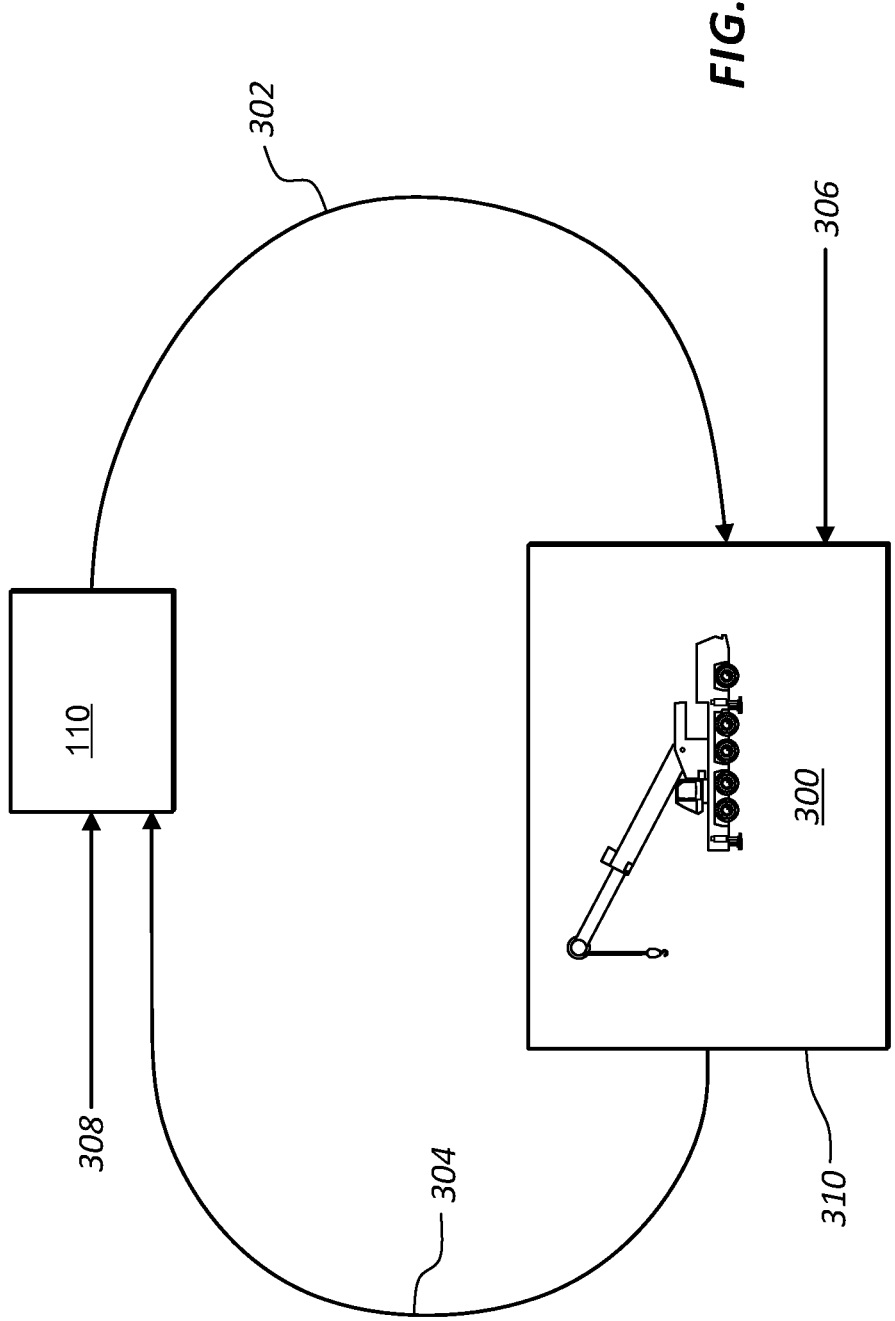
FIG. 3 is a schematic view of a model of a crane having a control system in accordance with an embodiment of the invention.

FIG. 3 illustrates the operation of the first control unit 110 and a crane model 300. The crane model 300 is an example of a device model 102 and is a mathematical representation of the crane 200. The first control unit 110 is operably coupled to the crane model 300 and provides controls signals 302 corresponding to control signals 202 that would be used in with the crane 200. The first control unit 110 may be the same type of control unit as the second control unit 112, or it may be a different control unit for testing purposes.

The operation of the crane model will now be shown in relation to the boom out signal of FIG. 2. A user inputs a command, such as a boom out command. The first control unit 110 then outputs a control signal 302 corresponding to the boom out command to the crane model 300. The crane model 300 simulates how the crane 200 would operate in response to receipt of the control signal 302 corresponding to the boom out. The crane model 300 generates an output 310 containing data that is representative of a condition of how the crane 200 operates in response to the control signal 302. For example, the control signal 302 may indicate a boom out command and the output might output a value indicating how far the boom would have extended. A feedback signal 304 may provide a model of a sensor on the crane that indicates a condition of the crane. For example, the feedback sensor may output a data value corresponding to a modeled measurement of the boom length. In some embodiments, the output 310 may be used as the feedback signal 304 for the first control unit 110.

The feedback signal 304 may be altered prior to being received by the first control unit 110. This may be done to simulate a fault in the feedback of the dynamic system. For example, the feedback signal 304 may be held at a constant value, indicating a stuck sensor. The first control system 110 may then be run through a command to observe how the system reacts to the bad sensor. In another embodiment, the feedback signal 304 may be altered to output an incorrect value when the device model is run through a procedure.

The control signal 302 may be modified to simulate an electrical fault going into the dynamic system. The outputs of the device model 300 may then be observed to monitor the behavior of the dynamic system in response to receiving the electrical fault.

In addition to the standard inputs and outputs of the crane 200, the crane model 300 may also accept inputs 306 that correspond to fault conditions. For example, the crane model 300 may accept an input indicating that a component has failed. This would represent a situation where an actual component on the crane 200 has failed without actually having to have the component fail. The crane model 300 is then able to determine how the control unit 110 will behave when the crane is experiencing a fault condition. For example, the crane model may simulate the effect of a sealing ring on the performance of the boom out operation. Input 306 may be triggered to indicate a defective seal. The crane model 300 would then alter its mathematical model to simulate the defective seal.

Inputs 306 may also be used to input condition values into the crane model 300. For example, it is beneficial to test the operation of the crane having varying loads. The inputs 306 may accept inputs indicating a mass of a load to be lifted. The inputs 306 could also be used to input other crane characteristics such as age, operating environment, etc. For each input, the crane model 300 would vary to take the characteristic into account.

Returning again to the example of FIG. 2, if the boom 200 was experiencing a fault, it may not extend as expected. The control system 110 should be able to recognize that the boom 200 is not extending properly and may take corrective action. Such corrective action could include alerting an operator, compensating to extend the boom 200, or shutting down operation of the crane 200. To test whether the control system 112 operates as intended, the crane model 300 may receive a fault signal 306 indicating a communication failure between the control 110 system and the boom. Then, when a boom out signal 302 is delivered to the crane model 300, the boom will be unresponsive to the control signal 302 and the feedback signal 304 will indicate that the boom is not moving. The control unit 110 should then take corrective action. The corrective action can be monitored to determine if the control unit 110 is functioning properly. If the control unit 110 were to take an unexpected action, it would indicate that the control unit 110 likely has an error in its design.

The dynamic system and the device model may be complex systems with redundant systems and interdependent systems. For example, the crane model may be modeled with many different dynamic components, each with different control signals and feedback signals, all of which may be dependent upon one another. Some dynamic components may continue to operate in the presence of certain fault signals, while other components may require corrective action.

The crane model may be used by an engineer to quickly evaluate a control systems operation without requiring the control system to be installed on an actual crane. Additionally, many control scenarios may be tested in a short period of time.

Returning to FIG. 1, the dynamic system 104 has a plurality of data sources associated with characteristics of the dynamic system 104. The characteristics include information about conditions such as an output of the dynamic system 104, an input to the dynamic system 104, and a service history of the dynamic system 104. For example, the output of the dynamic system 104 could be the position of crane components, the load a crane component is experiencing, a configuration of a component, the weather associated with the crane at a given time, the location of the crane, and other outputs associated with the dynamic system 104. The input to the dynamic system 104 includes control signals output from the control unit 110 controlling the dynamic system 104. The service history may include the age of a component, the frequency of use, the date of service, and other items related to the service history of the crane.

Like the dynamics system 104, the device model 102 also has a plurality of data sources associated with the input to the device model 102 and the output of the device model 102. For example, the output of the device model 102 could be a modeled position of crane components, a model load a modeled crane component is experiencing, a configuration of a the modeled component, a modeled weather associated with the crane model at a given time, the modeled location of the crane model, and other outputs associated with the device model 102. The input to the device model 102 may include control signals output from the first control system 110 controlling the device model 102. The service history may include a modeled age of a component, a modeled frequency of use, a modeled date of service, and other items related to a modeled service history of the crane.

The data collection and distribution system 106 collects data from a plurality of sources and delivers the data to at a plurality of data destinations. At least one data source may also be a data destination allowing for bidirectional communication. For example, the device model 102 may output data that is collected by the data collection and distribution system 106. The data collection and distribution system 106 may also deliver data to the device model 102. For example, if the device model 102 needs to be updated, the data collection and distribution system 106 may deliver the data necessary for the update. The data collection and distribution system 106 may collect data for more than a single component or system and may be operably coupled to differing components.

The data collection and distribution system 106 may collect data in a raw form and convert the data into a usable format, or it may collect data that has already been formatted. The data collection and distribution system 106 may be connected to the plurality of sources and destination by a physical connection, such as an Ethernet data connection, or the connection may be a wireless connection such as by radio signals. Additionally, there may be intermediary components between a data source and the data collection and distribution system 106. For example, outputs from the dynamic system may be stored in a database. The database may then be queried by the data collection and distribution system to collect data related to the dynamic system.

The data collection and distribution system is operably coupled to a data warehouse 108 that stores data collected from the plurality of sources. The data warehouse 108 may be accessed by data consumers for analysis of the data contained in the data warehouse 108. Data from the data warehouse 108 may be provided to data marts that contain data related to specific applications. For example, a filed issue data mart would store data related to issues experienced in the field by a crane. A fuel consumption data mart would store data related to the consumption of fuel. A location data mart would store data related to the location of cranes and/or crane components.

The data warehouse may contain data such as a unique identifier for each crane identified in the warehouse, a model type for each crane identified in the warehouse, and other identifying information. The data warehouse is operably coupled to a data analyst comprising at least one computing system for analysis of the data contained within the data warehouse. The at least one computing system may analyze data contained within the data ware house to determine the service condition of at least one crane identified in the data warehouse. The at least one computing system is operably coupled to the data collection and distribution system to distribute data back to the device model and the control system.

Figure 4:
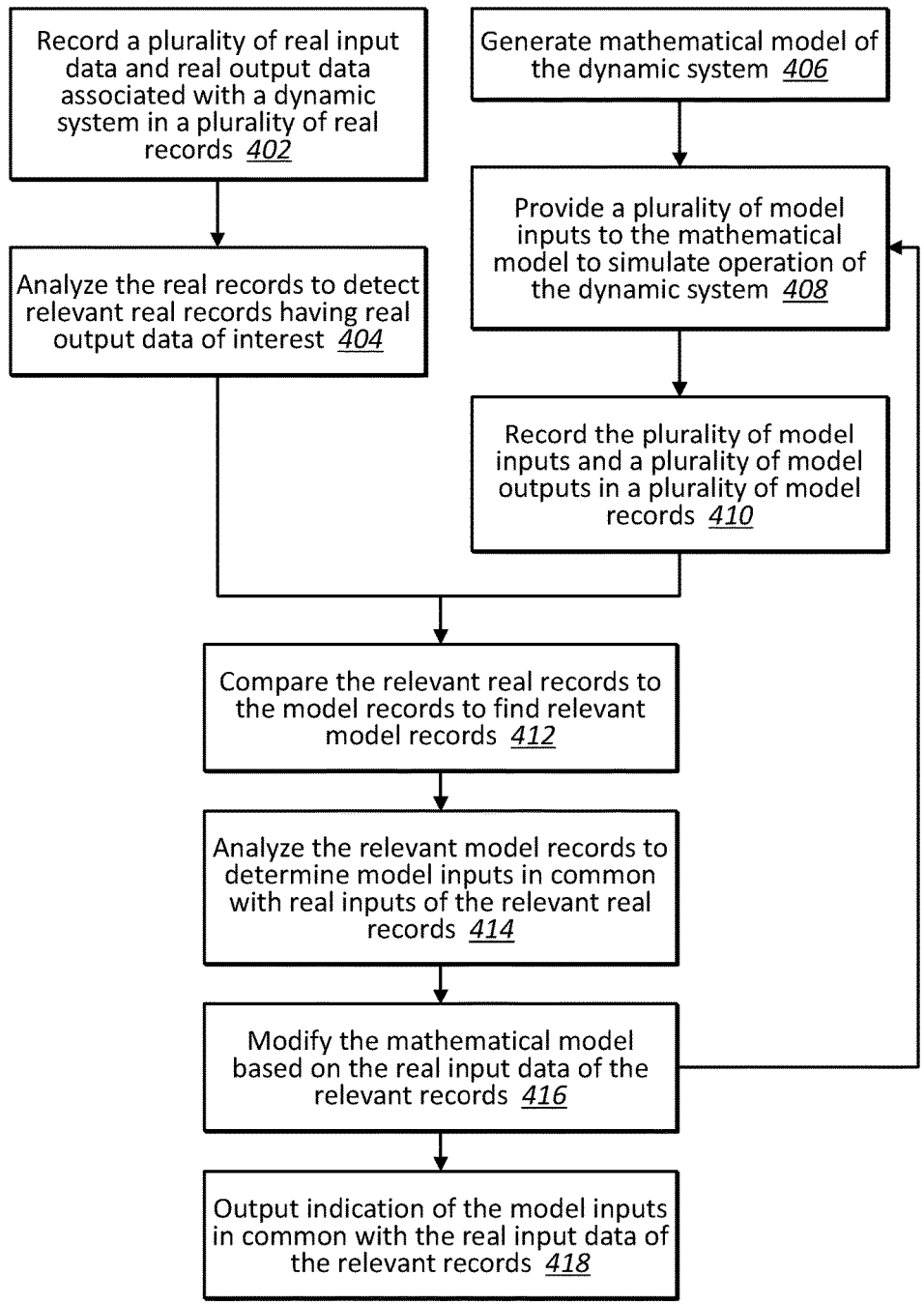
FIG. 4 is a schematic illustrating a process for analyzing service records to determine a cause of a fault and for updating a device model in accordance with an embodiment of the invention.

FIG. 4 illustrates a flowchart of a method that the remote diagnostic system may use to analyze data and update a device model. This method will be described in relation to the previously remote diagnostic system of FIG. 1.

The method begins with recording real input data and real output data associated with a dynamic system at act 402. The real input data and real output data may be recorded remotely, or saved to a local memory and then uploaded at a later date. For example, dynamic system 104 may be operated by a user while control system 112 stores real input data such as dynamic system identification, operator inputs, location data, and weather data, and real output data such as sensor outputs. The control system 112 may then transmit the real input data and real output data to the data warehouse 108 for storage through the data collection and distribution system 106. Or in another embodiment, the control system 112 may transmit the real input data and real output data immediately to the data warehouse 108 for storage. The real input data and real output data may be recorded in a plurality of real records.

The real records are analyzed to detect real records having real output data of interest in act 404. For example, data analyst 114 may analyze records in the data warehouse 108 and determine that a hydraulic cylinder of a crane consistently experiences excessive wear. In some embodiments the real records may be additionally analyzed to find real input data associated with the real output data of interest. For example, the data records may indicate that when a specific crane boom is used with a specific crane design, the hydraulic cylinder is more likely to experience excessive wear. The analysis done by the data analyst may comprise statistical sampling, data mining, or other common analysis techniques.

In act 406, a mathematical model of the dynamic system is generated. This may be done prior to recording the plurality of real output data and real input data with the operation of the dynamic system, or it could occur after the dynamic system was operated in the field. Generating the mathematical model may include updating an existing mathematical model.

In act 408 model input data is provided to the mathematical model to simulate operation of the dynamic system. The plurality of model input data may represent operating procedures, operating conditions, and component identifications. For example, in a mathematical model representing a crane, the plurality of model input data may include inputs modeling the crane doing standard lifting operations, weather conditions, and identification of components fitted to the crane.

In act 410 the model input data is recorded to model records along with model output data. The model output data may represent the modeled behavior of the dynamic system and include data such as modeled sensor output, modeled dynamic system physical characteristics, and modeled events. Referring again to a crane, the model output data could be modeled strain in a crane boom, modeled location of a crane boom, modeled temperature of a hydraulic cylinder, modeled failure of a component, or other modeled characteristics of the crane.

In act 412, the relevant real records are compared to the model records to find relevant model records having model output data corresponding to the real output data of interest. Using the previous example, the data analyst 114 may find model records indicating wear of the hydraulic cylinder as relevant model records.

In act 414, the relevant model records may be analyzed with the real records having the real output data of interest to determine if they share common input data. If they share common input data and output data, it is likely that the mathematical model is correctly modeling the dynamic system. Returning again to the crane example, the data analyst 114 may compare the data records having the specific crane boom, specific crane design, and excessive wear of the hydraulic cylinder with the relevant model records to determine if the relevant model records contain input data corresponding to the specific crane boom and specific crane design.

If the relevant model records are determined not to share common input data with the real records having the real output data of interest, the mathematical model is updated to reflect the recorded conditions that lead to the real output data of interest. In some mathematical models, it may be possible that a real input was not modeled in the mathematical model and the model is updated to include a modeled input corresponding to the real input. In the example of the crane, the mathematical may not have included an input corresponding to a boom type. Updating the mathematical model would then entail modifying the mathematical model to include an input for boom type and to account for different boom types. In other mathematical models, the real input may have been modeled, but may not have been accurate. Using the prior example, the boom type may be present as an input, but the mathematical model may have failed to take into account an effect of the boom interacting with the crane type. The mathematical model would be updated to account for the effect of the boom and crane type, but the inputs to the mathematical model would not change.

Figure 5:
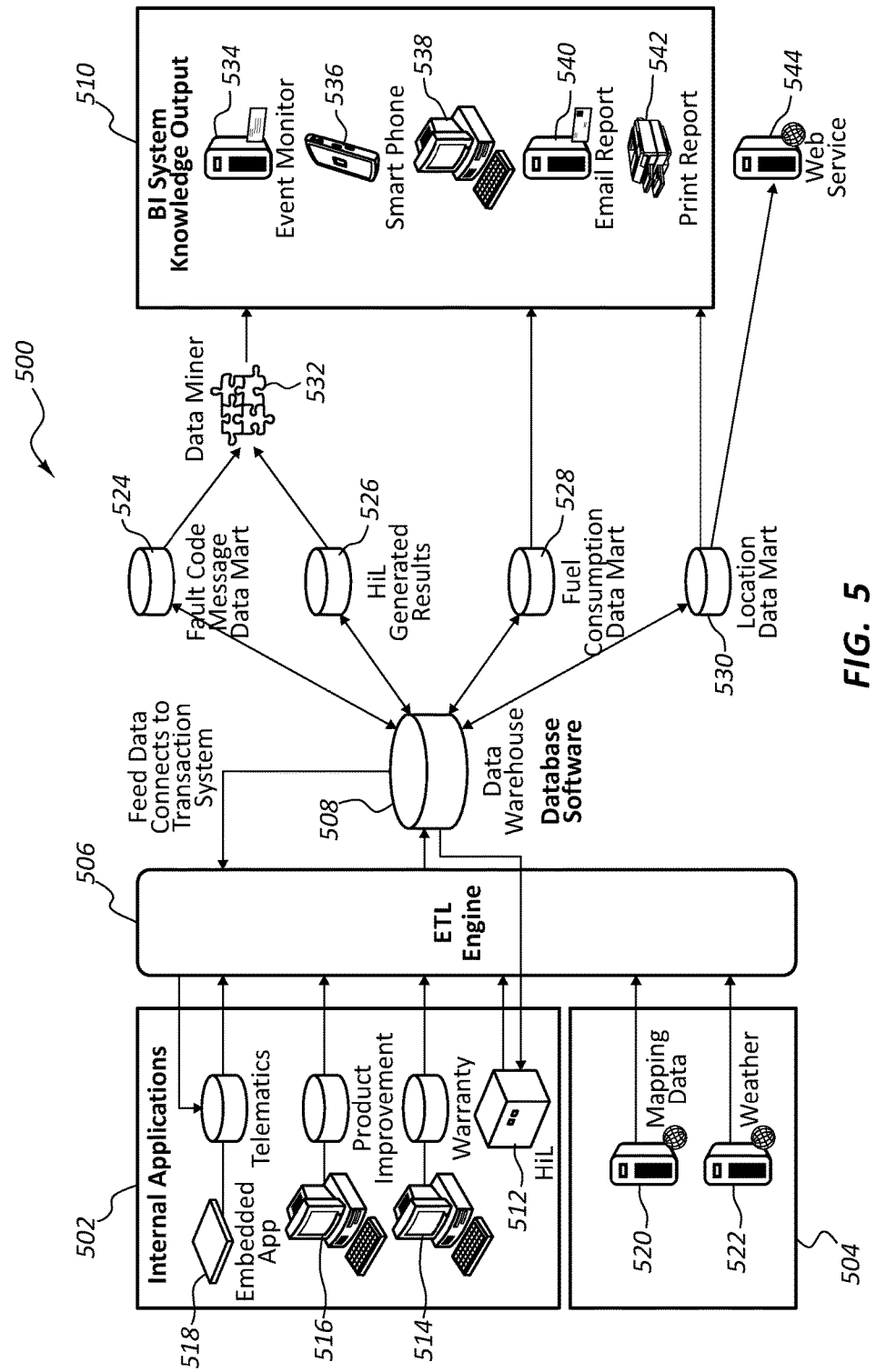
FIG. 5 is a schematic view of an embodiment of a system in accordance with an embodiment of the invention.

FIG. 5 is an illustration of an exemplary remote diagnostic system 500 in accordance with an embodiment of the invention. The remote diagnostic system 500 comprises internal applications 502, an extract, transform and load engine 506, a data warehouse 508, and knowledge output services 510. The remote diagnostic system 500 may further comprises external data sources 504.

The internal applications 502 are applications that a user of the remote diagnostic system 500 has in their control. The internal applications 502 include a hardware-in-the-loop 512 (HIL) testing component, a warranty service 514, a product improvement service 516, and a telematics system 518. The HIL 512 testing component is a form of a device model and simulates a dynamic system associated with the telematics system 518. The telematics system 518 is responsible for providing a communication link between a dynamic system and the extract transform and load engine 506. The warranty service 514 provides a means for reporting warranty information. For example, the warranty service 514 may be a customer service center responsible for warranty claims. The product improvement service 516 is a service for ongoing improvements to the dynamic system that may occur outside of the remote diagnostic system.

The external data sources 504 are services that are not under control of the user of the remote diagnostic system 500, but that provide publicly available data. The external data sources 504 may comprise mapping data 520 and weather data 522. In one embodiment the internal application may store a location and a time for the dynamic system, and then reference the external data sources to determine weather conditions at the stored time and location. This may be done at the time the data is stored at the data warehouse with the weather conditions stored as well, or the weather conditions may be recalled as needed based on data stored at the data warehouse.

The extract, transform and load engine 506 is responsible for distributing data between the various data sources and the data warehouse. Because data may exist in many different formats, the extract, transform, and load engine coverts the data, if necessary, to a common format. In this way varying systems can communicate with the data warehouse to store data.

The data warehouse 508 stores information generated by the internal applications and external data. The data warehouse may be a system of interconnected computers having persistent storage for storing data. In some embodiments the data warehouse 508 may consist of a single computer system. The data warehouse may be interconnected with other data storage components such as a fault code data mart 524, a HIL results database 526, a fuel consumption data mart 528, and a location data mart 530. In some embodiments these other data storage components may be an integral part of the data warehouse, or they may be separate, interconnected systems.

A data miner 532 may be operably coupled to the data warehouse 508 either directly, or indirectly as shown in FIG. 5. The data miner 532 is a system for analyzing the data contained within the data warehouse and includes data mining applications such as IBM SPSS Modeler®. The data miner may a computing system separate from the data warehouse, or it may be located within the data warehouse. The data miner may comprise a system of interconnected computers.

The knowledge output services 510 provide an interface for users of the remote diagnostic system 500 to interact with the data warehouse 508. The knowledge output service may comprise an event monitor 534, a smart phone application 536, a web application 538, email reports 540, print reports 542, and web services 544. The knowledge output services 510 allow a user of the remote diagnostic system to monitor a dynamic system and to be notified of events that may occur.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A remote diagnostic system comprising:
   a) a mechanical dynamic system in an operational field, the mechanical dynamic system producing real data during operation, the mechanical dynamic system comprising at least one crane or crane component;
   b) a device model, the device model comprising a mathematical model for simulating the mechanical dynamic system, the device model having an input interface for receiving a plurality of model inputs and an output interface for delivering a plurality of model outputs dependent upon the device model and the plurality of model inputs;
   c) a control system adapted to operably couple to the mechanical dynamic system, the control system configured to receive operator input and to control the mechanical dynamic system through control signals in response to the operator input;
   d) a data collection and distribution system, the data collection and distribution system configured to collect data from a plurality of data sources including the mechanical dynamic system, the device model, and the control system, and distribute data to a plurality of data destinations, wherein the data collected from the mechanical dynamic system includes the real data produced during operation of the mechanical dynamic system and the data collected from the device model includes the model outputs;
   e) a data warehouse operably coupled to the data collection and distribution system and configured to consolidate, aggregate, and store the collected data, and
   f) a data analyst operably coupled to the data warehouse, the data analyst configured to analyze the collected data to determine a service condition of the at least one crane or crane component.

2. The remote diagnostic system of claim 1 further comprising a data analysis system configured to mathematically analyze data in the data warehouse.

3. The remote diagnostic system of claim 1 further comprising a business intelligence system configured to report and display information from the data warehouse.

4. The remote diagnostic system of claim 1 wherein the device model comprises a computing system having instructions for emulating a crane and wherein the mechanical dynamic system comprises a crane.

5. The remote diagnostic system of claim 1 wherein the device model comprises a computing system having instruction for emulating a crane component and wherein the mechanical dynamic system comprises a crane component.

6. The remote diagnostic system of claim 1 wherein the field data comprises data represented characteristics selected from the group consisting of mechanical dynamic system outputs, mechanical dynamic system inputs, and service history.

7. The remote diagnostic system of claim 6 wherein the data collection and distribution system distributes inputs to the device model.

8. The remote diagnostic system of claim 7 wherein the inputs to the device model includes inputs for modifying the mathematical model.

9. The diagnostic system of claim 1 wherein the data warehouse stores a modeled fault condition corresponding to at least one data output of the device model and an associated at least one input of the device model.

10. The diagnostic system of claim 9 wherein the data warehouse stores an actual fault condition corresponding to at least one data output of the mechanical dynamic system.

11. The diagnostic system of claim 10 wherein the data warehouse compares the actual fault condition to the modeled fault condition and associates a fault cause with the actual fault condition dependent on the at least one input of the device model.

12. The diagnostic system of claim 10 wherein at least one inputs to the device model modifies the device model based on the actual fault condition and the field data.

13. A remote diagnostic system comprising:
a) a mechanical dynamic system in an operational field, the mechanical dynamic system producing real data during operation;
b) a device model stored in a memory, the device model simulating the mechanical dynamic system, the device model having an input interface for receiving a plurality of model inputs and an output interface for delivering a plurality of model outputs dependent upon the device model and the plurality of model inputs;
c) a control system having a hardware processor, the control system adapted to operably couple to the mechanical dynamic system, the control system configured to receive operator input and to control the mechanical dynamic system through control signals in response to the operator input;
d) a data collection and distribution system, the data collection and distribution system configured to collect data from a plurality of data sources including the mechanical dynamic system, the device model, and the control system, and distribute data to a plurality of data destinations; and
e) a data warehouse configured to consolidate, aggregate, and store the collected data in the memory,
wherein the data warehouse stores a modeled fault condition corresponding to at least one data output of the device model and an associated at least one input of the device model,
wherein the data warehouse stores an actual fault condition corresponding to at least one data output of the mechanical dynamic system, and
wherein the data warehouse compares the actual fault condition to the modeled fault condition and associates a fault cause with the actual fault condition dependent on the at least one input of the device model.

* * * * *

UNITED STATES PATENT AND TRADEMARK OFFICE
CERTIFICATE OF CORRECTION

PATENT NO. : 10,054,920 B2  
APPLICATION NO. : 14/590608  
DATED : August 21, 2018  
INVENTOR(S) : Oswald et al.

Page 1 of 2

It is certified that error appears in the above-identified patent and that said Letters Patent is hereby corrected as shown below:

In the Specification

In Column 1, Line 58, delete "able include" and insert -- able to include --, therefor.

In Column 3, Line 29, delete "data collection and distribution system 108." and insert -- data collection and distribution system 106. --, therefor.

In Column 3, Lines 30-31, delete "data collection and distribution system 108." and insert -- data collection and distribution system 106. --, therefor.

In Column 3, Lines 47-48, delete "data collection and distribution system 108" and insert -- data collection and distribution system 106 --, therefor.

In Column 5, Line 52, delete "boom 200" and insert -- boom 210 --, therefor.

In Column 5, Lines 54-55, delete "boom 200" and insert -- boom 210 --, therefor.

In Column 5, Line 57, delete "boom 200," and insert -- boom 210, --, therefor.

In the Claims

In Column 10, Line 41, in Claim 1, delete "data, and" and insert -- data; and --, therefor.

In Column 11, Line 4, in Claim 9, delete "The diagnostic" and insert -- The remote diagnostic --, therefor.

In Column 11, Line 8, in Claim 10, delete "The diagnostic" and insert -- The remote diagnostic --, therefor.

Signed and Sealed this  
Twenty-sixth Day of March, 2019

Andrei Iancu  
*Director of the United States Patent and Trademark Office*

In Column 11, Line 11, in Claim 11, delete "The diagnostic" and insert -- The remote diagnostic --, therefor.

In Column 11, Line 15, in Claim 12, delete "The diagnostic" and insert -- The remote diagnostic --, therefor.